(12) United States Patent
Onogi

(10) Patent No.: US 9,509,938 B2
(45) Date of Patent: Nov. 29, 2016

(54) DISPLAY UNIT

(75) Inventor: Yuu Onogi, Tokyo (JP)

(73) Assignee: Sony Corporation (JP)

( * ) Notice: Subject to any disclaimer, the term of this patent is extended or adjusted under 35 U.S.C. 154(b) by 402 days.

(21) Appl. No.: 13/527,827

(22) Filed: Jun. 20, 2012

(65) Prior Publication Data
US 2013/0004006 A1 Jan. 3, 2013

(30) Foreign Application Priority Data

Jun. 29, 2011 (JP) ................................. 2011-143756

(51) Int. Cl.
*H04N 5/64* (2006.01)
*H04R 1/02* (2006.01)

(52) U.S. Cl.
CPC .............. *H04N 5/642* (2013.01); *H04R 1/028* (2013.01); *H04R 2499/15* (2013.01)

(58) Field of Classification Search
CPC ...... G06F 1/1607; H04R 1/026; F16M 13/00
USPC ......................................................... 381/333
See application file for complete search history.

(56) References Cited

U.S. PATENT DOCUMENTS

| | | | | |
|---|---|---|---|---|
| 4,873,776 A * | 10/1989 | Hoffart | ............... | G09F 13/0413 40/572 |
| 5,169,114 A * | 12/1992 | O'Neill | ............... | E05B 73/0082 248/316.4 |
| 5,624,098 A * | 4/1997 | McDowell | ................ | F24C 3/12 248/188.8 |
| 5,769,374 A * | 6/1998 | Martin | .................. | G06F 1/1605 248/221.11 |
| 5,769,378 A * | 6/1998 | Correa | ....................... | 248/442.2 |
| 5,833,186 A * | 11/1998 | Kosmoski et al. | ...... | 248/221.11 |
| 5,970,161 A * | 10/1999 | Takashima et al. | .......... | 381/386 |
| 6,024,337 A * | 2/2000 | Correa | ........................ | 248/442.2 |
| 6,100,942 A * | 8/2000 | Hollenbaugh et al. | ....... | 348/836 |
| 8,374,357 B2 * | 2/2013 | Nakagawa | ....................... | 381/81 |
| 8,577,069 B2 * | 11/2013 | Hampton et al. | ............. | 381/345 |
| 2005/0031144 A1 * | 2/2005 | Mizuno et al. | ............... | 381/306 |
| 2005/0174728 A1 * | 8/2005 | Peng | ............................. | 361/683 |
| 2005/0232455 A1 * | 10/2005 | Monitto | ................ | H04R 1/026 381/335 |
| 2006/0043247 A1 * | 3/2006 | Bourque et al. | ........... | 248/274.1 |
| 2007/0274547 A1 * | 11/2007 | Ueno | ............................ | 381/306 |

(Continued)

FOREIGN PATENT DOCUMENTS

JP  2004-363952 A  12/2004

OTHER PUBLICATIONS

Arnscott Electronics Group (AEG), E40 41/2" Enclosure for 4" Speakers, Dec. 8, 1998, AEG, p. 1.*

(Continued)

*Primary Examiner* — Fan Tsang
*Assistant Examiner* — Angelica M McKinney
(74) *Attorney, Agent, or Firm* — Lerner, David, Littenberg, Krumholz & Mentlik, LLP

(57) ABSTRACT

A display unit includes: a main body section including a first front surface, a first rear surface, and a first side surface; one or a plurality of speaker boxes each including one or a plurality of speaker units and a housing containing the one or a plurality of speaker units, the one or a plurality of speaker boxes being selectively attachable with respect to one of the first side surface and the first rear surface in the main body section; and one or a plurality of attaching members commonly used for both at the time of attaching the one or a plurality of speaker boxes to the first side surface and at the time of attaching the one or a plurality of speaker boxes to the first rear surface.

9 Claims, 9 Drawing Sheets

(56) References Cited

U.S. PATENT DOCUMENTS

| | | | |
|---|---|---|---|
| 2008/0283702 A1* | 11/2008 | Ikerd | E04B 1/2604 248/228.1 |
| 2010/0158299 A1* | 6/2010 | Liu | 381/333 |
| 2010/0302492 A1* | 12/2010 | Kubota | G02F 1/134363 349/138 |
| 2014/0023220 A1* | 1/2014 | Ku et al. | 381/333 |

OTHER PUBLICATIONS

Arnscott Electronics Group (AEG), E404 1/2" Enclosure for 4" Speaker Dec. 8, 1998, Architects and Engineers Specifications.*

Arnscott Electronics Groups (AEG), E40 4 1/2" Enclosure for 4" Speaker, Dec. 8, 1998, Architects and Engineers Specifications.*

* cited by examiner

COMPARATIVE EXAMPLE 1

COMPARATIVE EXAMPLE 2

DISPLAY UNIT

CROSS-REFERENCE TO RELATED APPLICATION

The present application claims priority from Japanese Patent Application No. JP 2011-143756 filed in the Japanese Patent Office on Jun. 29, 2011, the entire content of which is incorporated herein by reference.

BACKGROUND

The present disclosure relates to a display unit suitable for a thin television or the like.

In recent years, a display unit for various broadcast waves, video images, and the like has been increased in size and decreased in thickness. Therefore, it has been demanded to realize a configuration in which an image display region is widened, a region other than the display region (frame region) is narrowed, and a thickness of a housing is decreased. In other words, in the display unit, it has been desired to narrow the frame and thin the thickness thereof.

Further, in an existing display unit, a speaker unit is housed in a housing of a main body section (display main body section). In these days, a display unit in which a speaker box including such a speaker unit is removably attached to a main body section has been proposed (for example, see Japanese Unexamined Patent Application Publication No. 2004-363952).

SUMMARY

In the display unit including the foregoing removable speaker box, aspects of attaching the speaker box to the main body section are allowed to be various. Therefore, usability of a user (viewer) is possibly improved.

However, in some cases, according to a method of attaching the speaker box, in exchange for improved usability, it may result in the high cost (increased cost of members). Therefore, a proposal of a method capable of decreasing a cost of members while improving usability of a user is desired.

It is desirable to provide a display unit capable of decreasing a cost of members while improving usability of a user.

According to an embodiment of the present disclosure, there is provided a display unit including: a main body section including a first front surface, a first rear surface, and a first side surface; one or a plurality of speaker boxes each including one or a plurality of speaker units and a housing containing the one or a plurality of speaker units, the one or a plurality of speaker boxes being selectively attachable with respect to one of the first side surface and the first rear surface in the main body section; and one or a plurality of attaching members commonly used for both at the time of attaching the one or a plurality of speaker boxes to the first side surface and at the time of attaching the one or a plurality of speaker boxes to the first rear surface.

In the display unit according to the embodiment of the present disclosure, the speaker box is selectively attachable with respect to one of the first side surface and the first rear surface in the main body section. Thereby, variety of aspects of attaching the speaker box to the main body section according to usage aspects of the display unit (for example, arrangement type such as stationary type and wall-hanging type), usage purposes (for example, a purpose with a high regard for design such as realizing a narrowed frame, a purpose with a high regard for sound quality outputted from the speaker unit, and the like), and the like is realized. Further, in attaching the speaker box to the main body section, the single attaching member is commonly used for both at the time of attachment to the first side surface and at the time of attachment to the first rear surface (the attaching member is shared). Thereby, for example, differently from in a case in which separate (individual or exclusive) attaching members are used at the time of attachment to the first side surface and at the time of attachment to the first rear surface, a member (attaching member) not used (unnecessary) at the time of each attachment does not exist.

In the display unit according to the embodiment of the present disclosure, the speaker box is selectively attachable with respect to one of the first side surface and the first rear surface in the main body section. In addition, the attaching member is commonly used for both at the time of attachment to the first side surface and at the time of attachment to the first rear surface. Therefore, while variety of aspects of attaching the speaker box to the main body section is realized, a member unnecessary at the time of the respective attachment works is allowed to be omitted. Therefore, while usability of a user is improved, cost of members is allowed to be decreased.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

An embodiment of the present disclosure will be hereinafter described in detail with reference to the drawings. The description will be given in the following order.

1. Embodiment (example in which a speaker box is selectively attached to one of a rear surface and a lower surface of a main body section)

2. Modifications

First Modification (example in which a speaker box is selectively attached to one of a rear surface and an upper surface of a main body section)

Second Modification (example in which a speaker box is selectively attached to one of a rear surface, and a right surface and a left surface of a main body section)

Embodiment

Configuration of Display Unit 1

Figure 1:
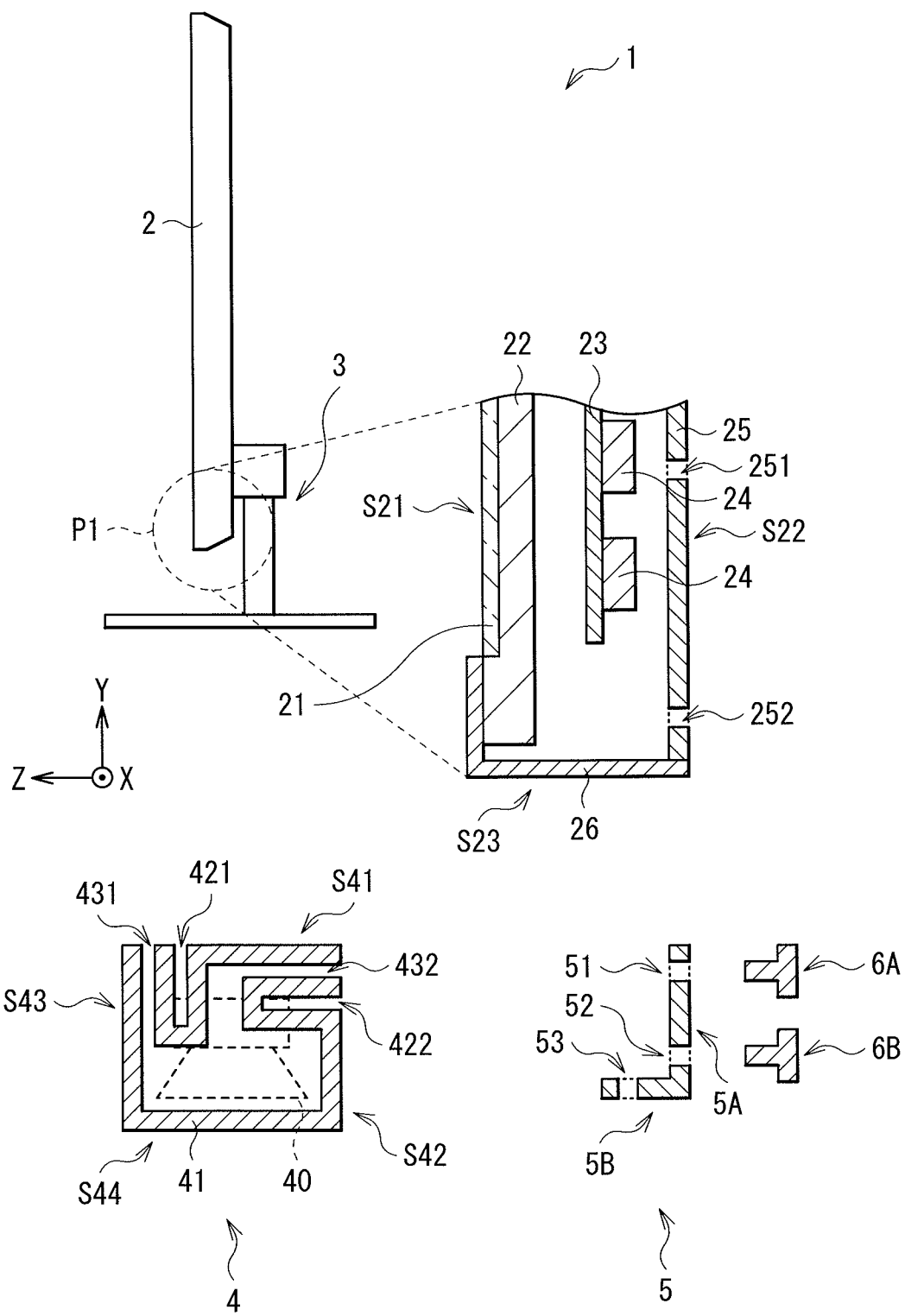
FIG. 1 is a schematic view illustrating an outline configuration of a display unit according to an embodiment of the present disclosure.

FIG. 1 schematically illustrates an outline configuration of a display unit (display unit 1) according to an embodiment of the present disclosure. The display unit 1 is, for example, used as a thin television, and has a configuration in which a flat main body section (display main body section) 2 for displaying an image is supported by a stand 3. The display unit 1 further includes a speaker box 4, and one attaching member 5 and two attaching screws 6A and 6B that are used for attaching the speaker box 4 to the main body section 2. The display unit 1 is used as a stationary (table top) type display unit laid on a horizontal surface such as a floor, a shelf, and a table in a state that the stand 3 is attached to the main body section 2. In addition, the display unit 1 may be used as a wall-hanging type display unit in a state that the stand 3 is removed from the main body section 2. In FIG. 1, a cross-sectional configuration example of a region indicated by referential symbol P1 (region on a lower surface S23 side out of side surfaces in the main body section 2) is schematically illustrated.

[Main Body Section 2]

The main body section 2 has, for example, a front surface plate 21, a display panel 22, an electronic substrate (control-part substrate) 23, electronic parts (control parts) 24, and a rear cover (rear surface cover) 25 sequentially from a front surface S21 (first front surface) side (viewer side) to a rear surface S22 (first rear surface) side. The main body section 2 further has a frame (bezel) 26 on the periphery (frame region) of the front surface plate 21 and the whole side surface (first side surface) of the main body section 2. In the following description, as illustrated in FIG. 1 and the like, the horizontal direction (longitudinal direction in the display surface in the main body section 2) is referred to as X-axis direction, the vertical direction (short-axis direction in the display surface in the main body section 2) is referred to as Y-axis direction, and the thickness (depth) direction in the main body section 2 is referred to as Z-axis direction.

The front surface plate 21 is made of, for example, a transparent plate glass or the like. A viewer is able to view an image displayed on the display panel 22 through the front surface plate 21. In some cases, the front surface plate 21 may be omitted.

The display panel 22 is provided on the rear surface side of the front surface plate 21. The display panel 22 is formed by, for example, using a liquid crystal display device. It is to be noted that instead of such a liquid crystal display device, other display device such as a plasma display device, an organic EL (electro luminescence) display device, an inorganic EL display device, an electrodeposition display device, and an electrochromic display device may be used for the display panel 22.

The electronic substrate 23 is a substrate mounted with the electronic parts 24 formed of a control IC (integrated circuit) such as a microcomputer, a power source IC, a resistance element, a capacitative element, or the like. A given circuit is formed on the electronic substrate 23 through a printed wiring or the like. The electronic parts 24 on the electronic substrate 23 are electrically connected to the display panel 22 directly or indirectly through a not-shown wiring or the like.

The rear cover 25 is arranged on the rear surface side (the most rear surface of the main body section 2) of the electronic substrate 23 and the electronic parts 24. The rear cover 25 is made of a resin material such as an ABS resin (acrylonitrile-butadiene-styrene resin), PS (polystyrene), a resin material obtained by adding the ABS resin to a PC resin (polycarbonate resin), or a resin material obtained by adding PPE (polyphenylene ether) to PS. Instead of the foregoing resin materials, for example, the rear cover 25 may be made of a metal material such as iron, aluminum, and stainless steel, and for example, a coated steel plate, a laminated steel plate, a hairline-finished plate, or the like may be used for the rear cover 25.

In the rear cover 25 (the rear surface S22 of the main body section 2), two types of screw holes 251 and 252 (through holes) are provided. The screw hole 251 (first main body screw hole) is arranged on upper side (positive side in the Y-axis direction) on the rear surface S22 than the screw hole 252 (second main body screw hole). The screw hole 251 is a screw hole selectively used in attaching the speaker box 4 to the rear surface S22. Meanwhile, the screw hole 252 is arranged on lower side (negative side in the Y-axis direction) on the rear surface S22 than the screw hole 251. The screw hole 252 is a screw hole selectively used in attaching the speaker box 4 to the lower surface S23. Details of aspects of attaching the speaker box 4 will be described later (FIG. 6A to FIG. 8B).

[Speaker Box 4]

Figure 2:
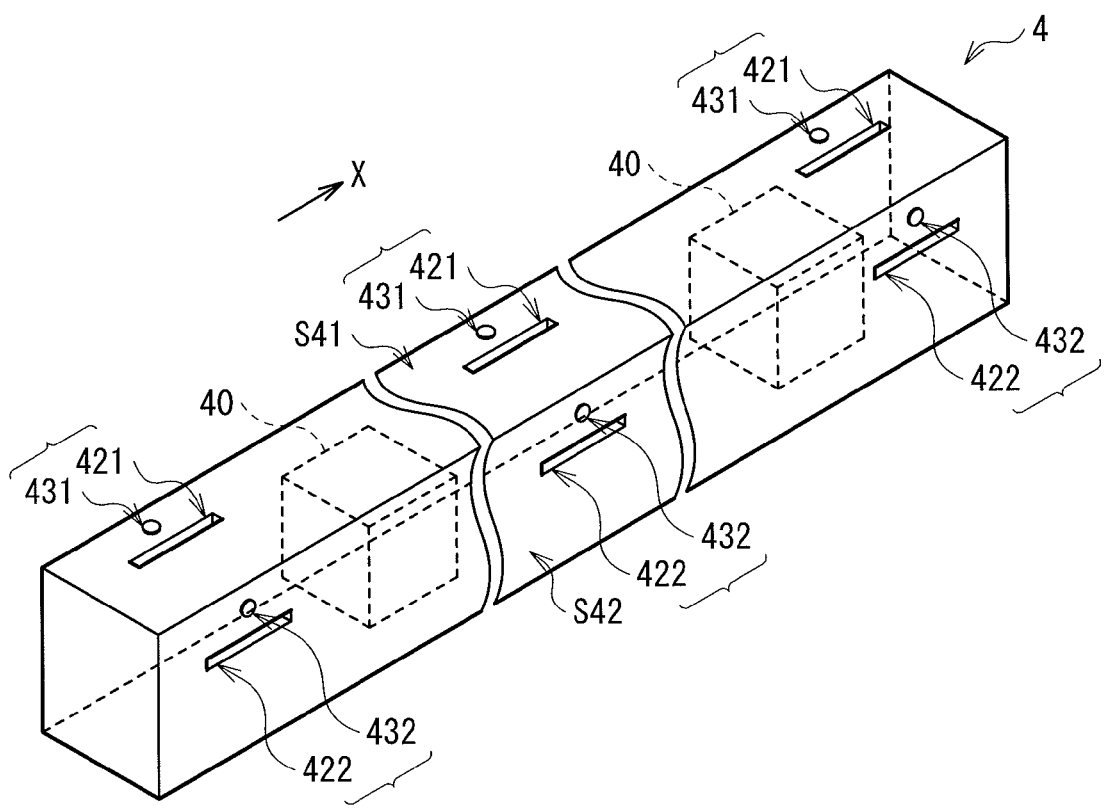
FIG. 2 is a perspective view illustrating an appearance configuration of a speaker box illustrated in FIG. 1.

FIG. 2 is a perspective view of an appearance configuration of the speaker box 4. The speaker box 4 has, as illustrated in FIG. 1 and FIG. 2, a speaker unit 40 and a housing (package member) 41 to contain (house) the speaker unit 40. As described later, the speaker box 4 is selectively attachable with respect to one of the lower surface S23 and the rear surface S22 in the main body section 2.

The speaker unit 40 is a member that outputs sound (including music, sound effect, and the like) to the outside (sound output section). As illustrated in FIG. 2, as an example, two speaker units 40 for outputting right-use sound and left-use sound are arranged along the X-axis direction (longitudinal direction of the housing 41).

In this case, the housing 41 is in the shape of a rectangle with the X-axis direction as its longitudinal direction. The housing 41 has a front surface S44 (second front surface), a rear surface S41 (second rear surface), and a side surface (second side surface) including an upper surface S43 and a lower surface S42 that are defined by arrangement direction of the speaker unit 40. In other words, the surface on the side from which sound is outputted from the speaker unit 40 is defined as the front surface S44, and the surface opposed to the front surface S44 is defined as the rear surface S41.

In the housing 41, holes (two types of holes) used in attaching the speaker box 4 to the main body section 2 are provided respectively in the rear surface S41 and the lower surface S42. Specifically, in the rear surface S41, an attaching hole 421 (first attaching hole) formed by sinking the housing 41 itself into the internal side and a screw hole 431 (first speaker screw hole) as a hole with respect to the housing 41 are provided. Further, similarly, in the lower surface S42, an attaching hole 422 (second attaching hole)

formed by sinking the housing 41 itself into the internal side and a screw hole 432 (second speaker screw hole) as a hole with respect to the housing 41 are provided. It is to be noted that as illustrated in FIG. 2, in this case, three (three pairs) of the attaching holes 421 and 422 and the screw holes 431 and 432 are respectively provided along the X-axis direction. However, the number of holes is not limited thereto, and one pair thereof, two pairs thereof, or four or more pairs thereof may be provided.

[Attaching Member 5]

Figure 3:
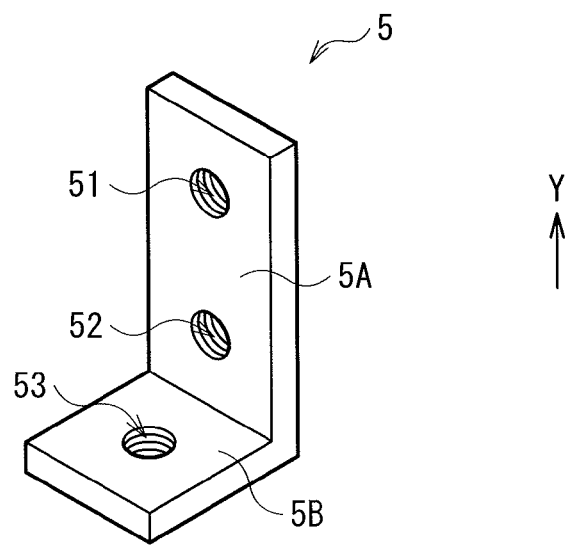
FIG. 3 is a perspective view illustrating an appearance configuration of an attaching member illustrated in FIG. 1.

FIG. 3 is a perspective view of an appearance configuration of the attaching member 5. Though described in detail later, the attaching member 5 is a member commonly used (shared) for both at the time of attaching the speaker box 4 to the lower surface S23 of the main body section 2 and at the time of attaching the speaker box 4 to the rear surface S22 of the main body section 2 (common attaching member). The attaching member 5 is made of, for example, a material such as a resin, iron, aluminum, and stainless steel. The attaching member 5 includes a flat connection section 5A (first connection section) extending along the Y-axis direction and a flat connection section 5B (second connection section) bent to be substantially perpendicular to the connection section 5A. In other words, the attaching member 5 is in the shape of L bent so that the connection sections 5A and 5B are substantially perpendicular to each other.

Though described in detail later, the connection section 5A is a connection section (attaching section) used for both connecting with the main body section 2 side and connecting with the speaker box 4 side. The connection section 5A has two screw holes 51 and 52 (through holes) along the Y-axis direction. The screw hole 51 (first member screw hole) is arranged farther from the connection section 5B side (negative side in the Y-axis direction) than the screw hole 52 (second member screw hole). The screw hole 51 is a screw hole used for both attaching the speaker box 4 to the lower surface S23 of the main body section 2 and attaching the speaker box 4 to the rear surface S22 of the main body section 2. Meanwhile, the screw hole 52 is a screw hole selectively used for attaching the speaker box 4 to the lower surface S23 of the main body section 2.

Though described in detail later, the connection section 5B is a connection section (attaching section) selectively used for connecting with the speaker box 4 side. The connection section 5B has one screw hole 53 (through hole, third member screw hole). The screw hole 53 is a screw hole selectively used for attaching the speaker box 4 to the rear surface S22 of the main body section 2.

[Attaching Screws 6A and 6B]

Though described in detail later, the attaching screws 6A and 6B are screws respectively used for attaching the speaker box 4 to the lower surface S23 or the rear surface S22 of the main body section through the attaching member 5. Specifically, the attaching screws 6A and 6B are fastened by using the screw holes 251 and 252 in the rear cover 25, the screw holes 431, 432, and the like in the housing 41, and the screw holes 51, 52, and 53 in the attaching member 5, and thereby the foregoing attachment (fixation) is made.

[Function and Effect of Display Unit 1]

1. Basic Operation

In the display unit 1, according to control by the respective electronic parts 24 on the electronic substrate 23, display operation is made in respective pixels (display devices) on the display panel 22, and an image is displayed. The image displayed on the display 22 as above is allowed to be viewed by a user (viewer) on the front surface S21 side of the main body section 2 through the front surface plate 21. Further, for example, according to control by the respective electronic parts 24 on the electronic substrate 23, sound is outputted from the respective speaker units 40 in the speaker box 4, and the user is able to listen to the sound.

2. Aspects of Attaching Speaker Box 4

Next, a description will be given in detail of aspects of attaching the speaker box 4 (arrangement aspects of the speaker unit 40) as one of the characteristics according to the embodiment of the present disclosure in comparison to comparative examples (Comparative examples 1 and 2).

2-1. Comparative Example 1

Figure 4A:
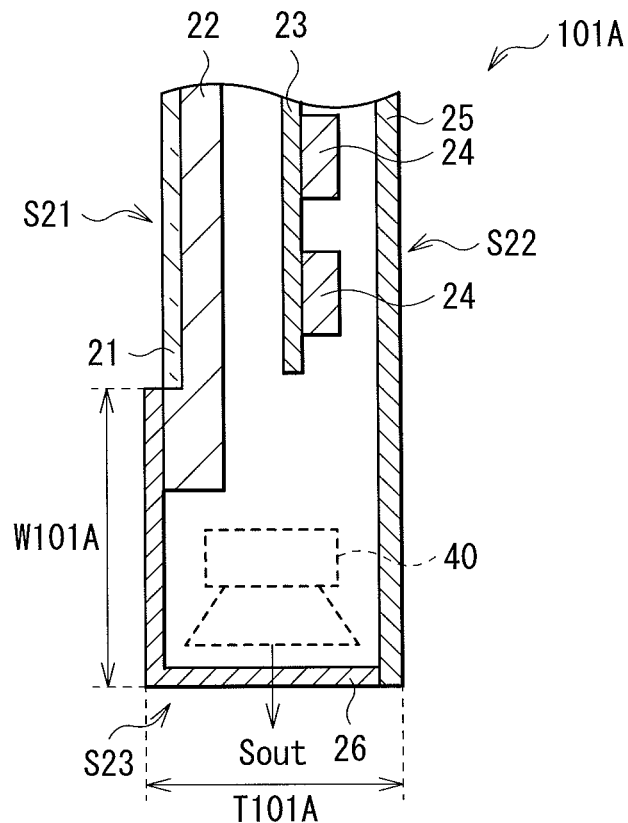
FIGS. 4A and 4B are schematic views illustrating cross-sectional configurations of display units according to Comparative example 1.
Figure 4B:
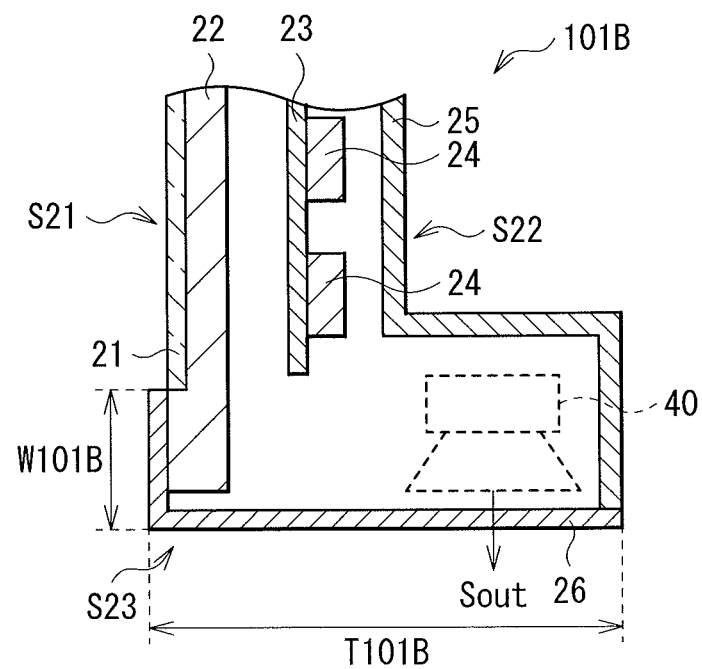

FIGS. 4A and 4B schematically illustrate part of cross-sectional configurations of display units (display units 101A and 101B) according to Comparative example 1. FIG. 4A illustrates the cross-sectional configuration of the display unit 101A, and FIG. 4B illustrates the cross-sectional configuration of the display unit 101B respectively. The display units 101A and 101B according to Comparative example 1 respectively house the speaker unit 40 in main body sections 102A and 102B (in this case, in end region on the lower surface S23 side in the main body sections 102A and 102B).

Specifically, in the display unit 101A illustrated in FIG. 4A, the speaker unit 40 is housed on the lower side of the display panel 22 so that sound Sout is outputted in the lower direction (negative side in the Y-axis direction). Therefore, in the display unit 101A, while a width W101A of the frame region is relatively large, a thickness (depth) T101A of the main body section 102A is relatively small. Therefore, the display unit 101A has a configuration suitable as what we call wall-hanging type that is a usage aspect with a high regard for realizing a thinned display unit.

Meanwhile, in the display unit 101B illustrated in FIG. 4B, the speaker unit 40 is housed on the rear surface side of the display panel 22, the electronic substrate 23, the electronic parts 24, and the like so that the sound Sout is outputted in the lower direction. Therefore, in the display unit 101B, while a width W101B of the frame region is relatively small, a thickness T101B of the main body section 102A is relatively large. Therefore, the display unit 101B has a configuration suitable as what we call stationary type that is a usage aspect with a high regard for realizing a narrowed frame.

As described above, the display units 101A and 101B according to Comparative example 1 have the configurations in which the usage aspects (for example, arrangement type such as stationary type and wall-hanging type) and the like are previously fixed. Therefore, usability of a user is degraded.

2-2. Comparative Example 2

Figure 5A:
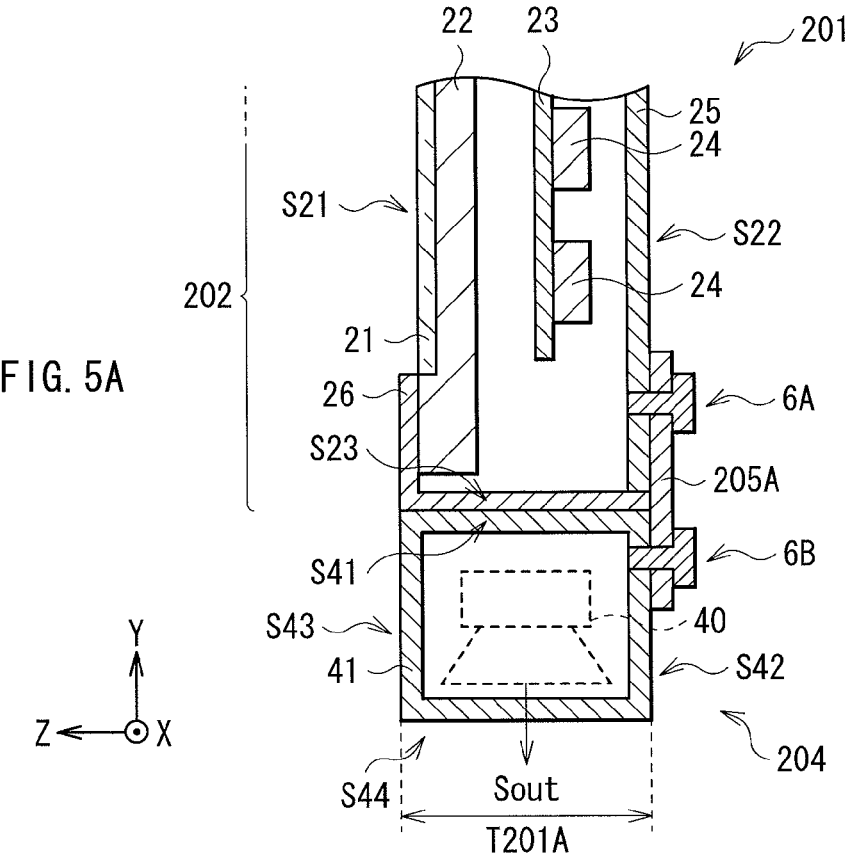
FIGS. 5A and 5B are schematic views illustrating cross-sectional configurations of a display unit according to Comparative example 2.
Figure 5B:
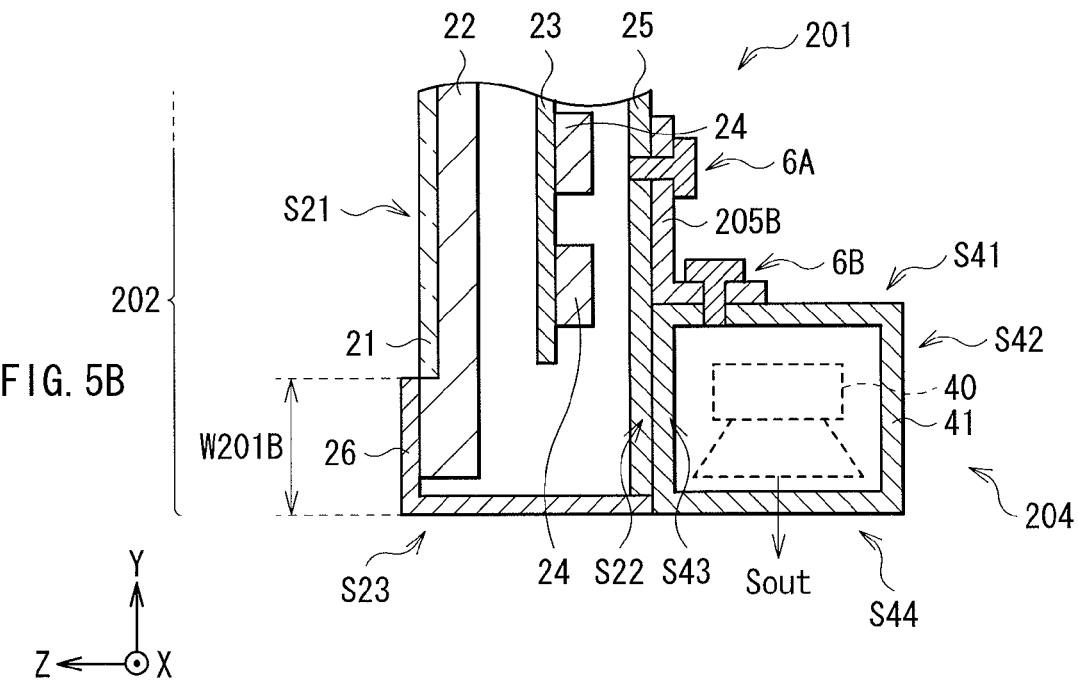

FIGS. 5A and 5B schematically illustrate part of cross-sectional configurations of a display unit (display unit 201) according to Comparative example 2. The display unit 201 according to Comparative example 2 includes a main body section 202, a speaker box 204 housing the speaker unit 40, two (two types of) attaching members 205A and 205B, and the two attaching screws 6A and 6B.

In Comparative example 2, differently from in Comparative example 1 mentioned above, the speaker box 204 is selectively attachable with respect to one of the lower surface S23 and the rear surface S22 in the main body section 202.

Specifically, in the example illustrated in FIG. 5A, the speaker box 204 is attached to the lower surface S23 of the main body section 202 so that the lower surface S23 of the main body section 202 is contacted with the rear surface S41 of the housing 41, and the sound Sout is outputted in the lower direction. At this time, more specifically, the attaching screw 6A is fastened on to the rear cover 25 of the main body section 202 through the flat attaching member 205A used exclusively for attachment to the lower surface S23, and the attaching screw 6B is fastened on to the lower surface S42 of the housing 41 in the speaker box 204, and thereby the foregoing attachment is made. In this case, in the display unit 201, a thickness T201A of the main body section 202 is relatively small. Therefore, the display unit 201 has a configuration suitable as wall-hanging type that is a usage aspect with a high regard for realizing a thinned display unit.

Meanwhile, in the example illustrated in FIG. 5B, the speaker box 204 is attached to the rear surface S22 of the main body section 202 so that the rear surface S22 of the main body section 202 is contacted with the upper surface S43 of the housing 41, and the sound Sout is outputted in the lower direction. At this time, more specifically, the attaching screw 6A is fastened on to the rear cover 25 of the main body section 202 through the L-shaped attaching member 205B used exclusively for attachment to the rear surface S22, and the attaching screw 6B is fastened on to the rear surface S41 of the housing 41 in the speaker box 204, and thereby the foregoing attachment is made. In this case, in the display unit 201, a width W201B of the frame region is relatively small. Therefore, the display unit 201 has a configuration suitable as stationary type that is a usage aspect with a high regard for realizing a narrowed frame.

As described above, in the display unit 201 according to Comparative example 2, differently from in Comparative example 1 mentioned above, the usage aspects (for example, arrangement type such as stationary type and wall-hanging type) and the like are allowed to be adjusted according to the aspects of attaching the speaker box 204 to the main body section 202. Therefore, variety of aspects of attaching the speaker box 204 to the main body section 202 according to usage aspects of the display unit 201 and the like is realized, and usability of a user is allowed to be more improved than in Comparative example 1 mentioned above.

However, in Comparative example 2, as described above, at the time of attachment to the lower surface S23 of the main body section 202 and at the time of attachment to the rear surface S22 of the main body section 202, separate (individual or exclusive) attaching members 205A and 205B are used. Therefore, at the time of each attachment, a member (the attaching member 205A or the attaching member 205B) not used (unnecessary) exists. Accordingly, two types of attaching members are necessitated, and cost of members is increased by just that much.

2-3. Function of Embodiment

Meanwhile, in the display unit 1 according to this embodiment, as illustrated in FIG. 1 to FIG. 3, first, as in Comparative example 2 mentioned above, the speaker box 4 is selectively attachable with respect to one of the lower surface S23 and the rear surface S22 in the main body section 2. Thereby, variety of aspects of attaching the speaker box 4 to the main body section 2 according to usage aspects of the display unit 1 (for example, arrangement type such as stationary type and wall-hanging type) and usage purposes (for example, a purpose with a high regard for design such as realizing a narrowed frame, a purpose with a high regard for sound quality outputted from the speaker unit 40, and the like) is realized.

Further, in attaching the speaker box 4 to the main body section 2, the single attaching member 5 (and the attaching screws 6A and 6B) is commonly used (shared) for both at the time of attachment to the lower surface S23 and at the time of attachment to the rear surface S22. Thereby, differently from in Comparative example 2 mentioned above in which the attaching member used at the time of attachment to the lower surface S23 is different from that used at the time of attachment to the rear surface S22, at the time of each attachment, a member (attaching member) not used (unnecessary) does not exist. In other words, at the time of each attachment, it is enough to use the single attaching member 5.

A description will be given in detail of usage aspects of the display unit 1 (aspects of attaching the speaker box 4) with reference to FIG. 6A to FIG. 8B.

[First Usage Aspect]

Figure 6A:
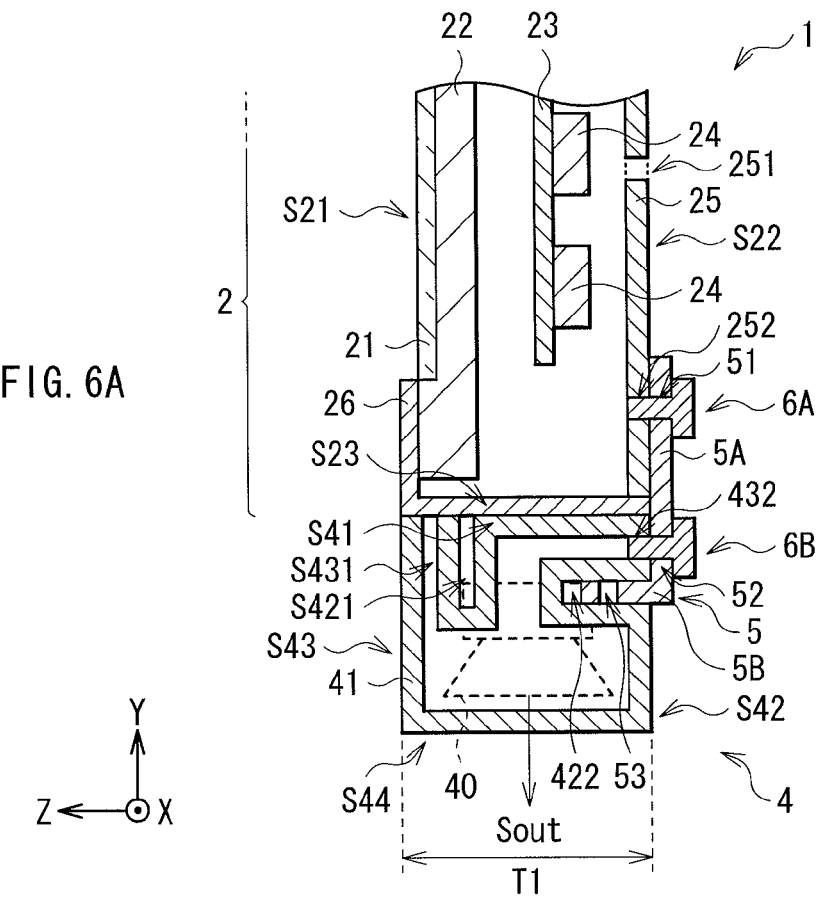
FIGS. 6A and 6B are schematic views for explaining a first usage aspect of the display unit illustrated in FIG. 1.
Figure 6B:
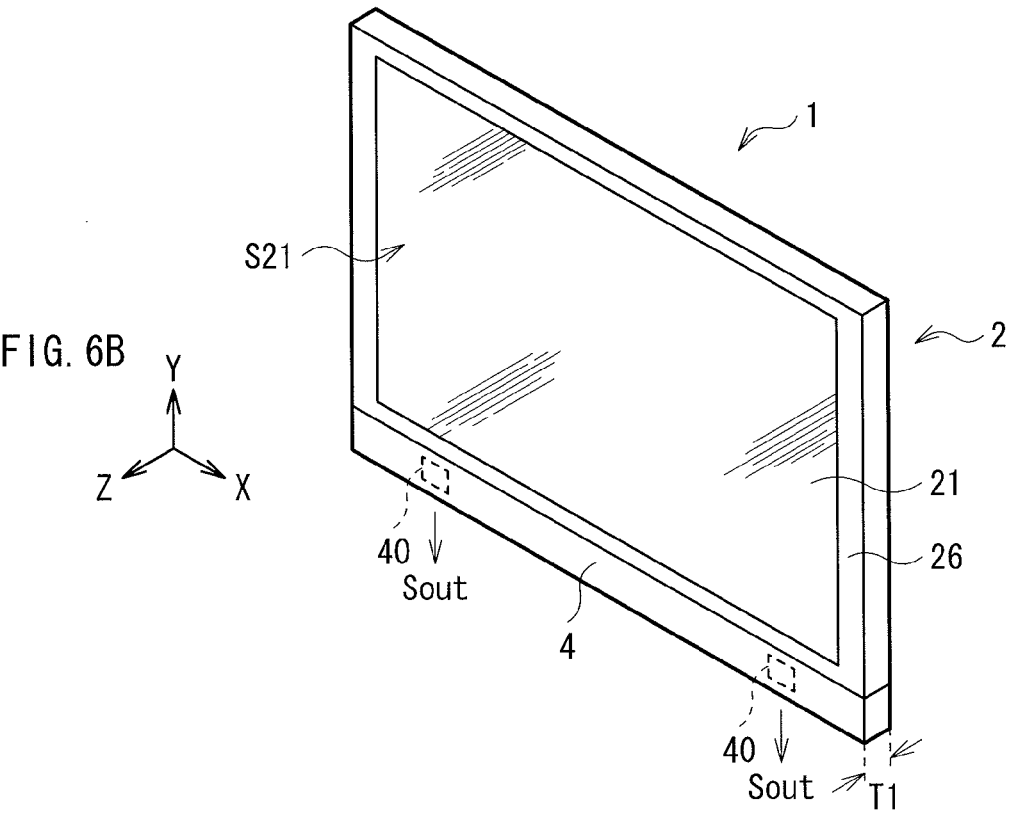

First, in a first usage aspect illustrated in FIGS. 6A and 6B, the speaker box 4 is attached to the lower surface S23 of the main body section 2 so that the lower surface S23 of the main body section 2 is contacted with the rear surface S41 of the housing 41, and the sound Sout is outputted in the lower direction. At this time, more specifically, the attaching screw 6A is fastened by using the screw hole 51 in the attaching member 5 and the screw hole 252 in the rear cover 25 of the main body section 2, and thereby the rear surface S22 in the main body section 2 and the connection section 5A in the attaching member 5 are connected with each other. Further, the attaching screw 6B is fastened by using the screw hole 52 in the attaching member 5 and the screw hole 432 in the housing 41 of the speaker box 4, and thereby the lower surface S42 in the housing 41 of the speaker box 4 and the connection section 5A in the attaching member 5 are connected with each other. Further, the connection section 5B in the attaching member 5 is inserted into the attaching hole 422 in the housing 41 of the speaker box 4, and thereby the lower surface S42 in the housing 41 of the speaker box 4 and the connection section 5B in the attaching member 5 are connected with each other.

In the first usage aspect, in the display unit 1, a thickness T1 of the main body section 2 is relatively small. Therefore, the first usage aspect has a configuration suitable as wall-hanging type that is a usage aspect with a high regard for realizing a thinned display unit. Further, the sound Sout from the speaker unit 40 is outputted in the lower direction (the sound Sout is not outputted to the user side). Therefore, the first usage aspect has a configuration with a high regard for design more than sound.

[Second Usage Aspect]

Figure 7A:
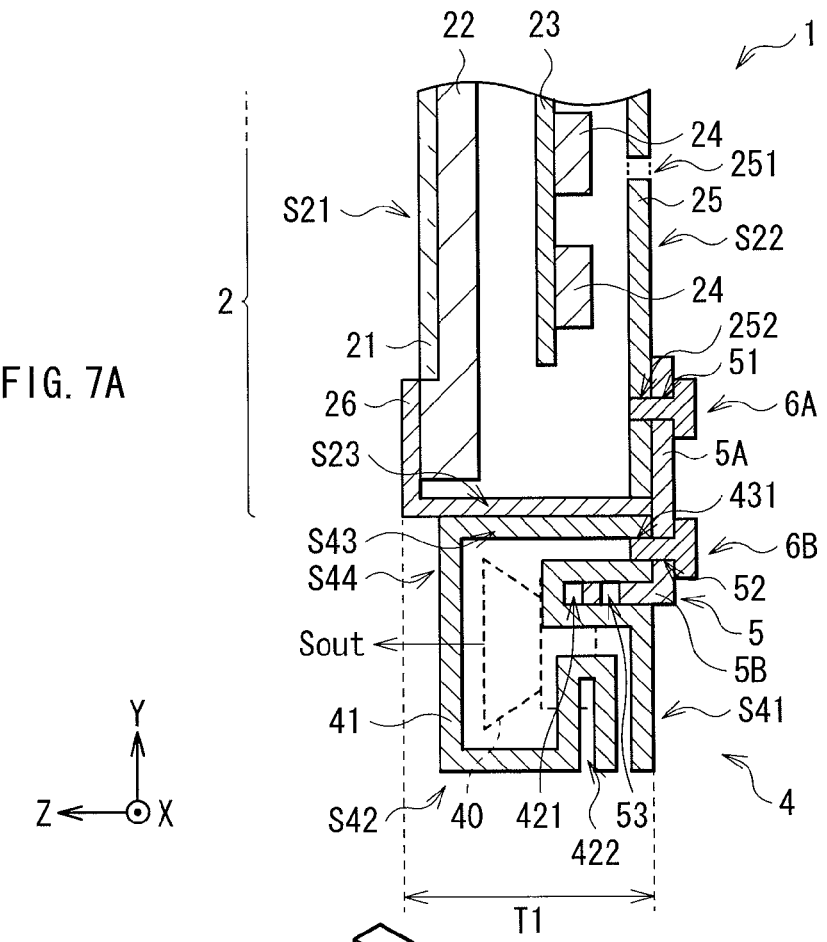
FIGS. 7A and 7B are schematic views for explaining a second usage aspect of the display unit illustrated in FIG. 1.
Figure 7B:
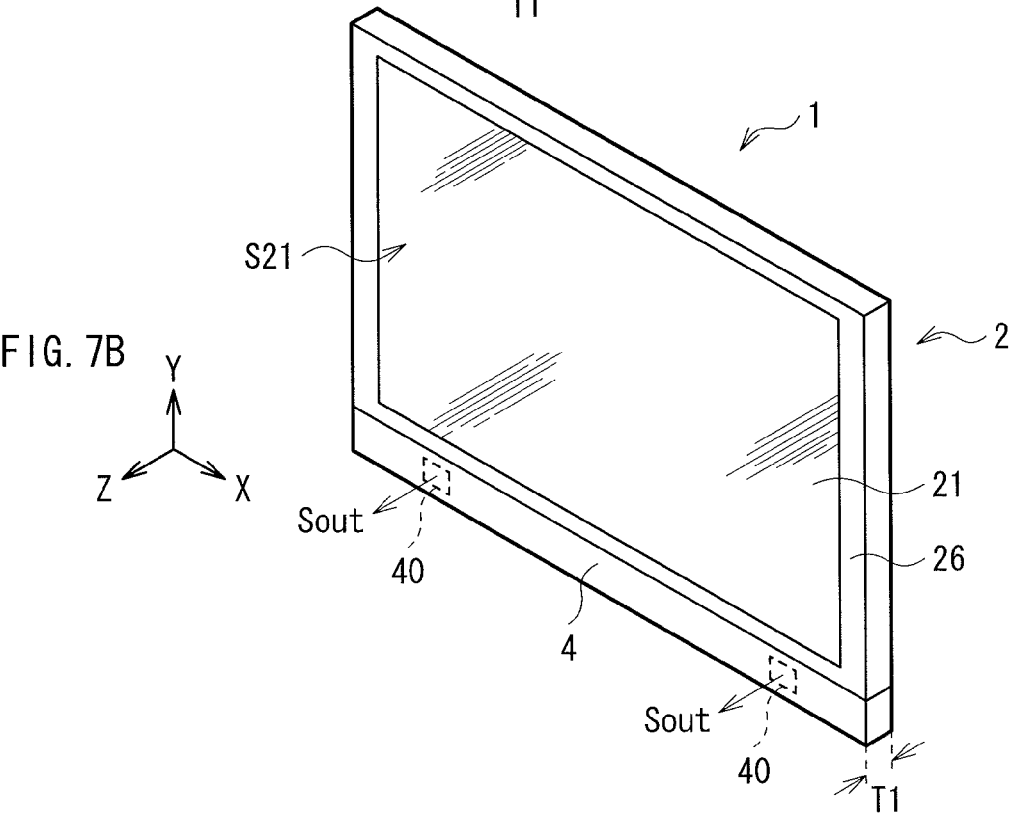

Meanwhile, in a second usage aspect illustrated in FIGS. 7A and 7B, the speaker box 4 is attached to the lower surface S23 of the main body section 2 so that the lower surface S23 of the main body section 2 is contacted with the upper surface S43 of the housing 41, and the sound Sout is outputted to the user side (positive side in the Z-axis direction). At this time, more specifically, the attaching screw 6A is fastened by using the screw hole 51 in the attaching member 5 and the screw hole 252 in the rear cover 25 of the main body section 2, and thereby the rear surface S22 in the main body section 2 and the connection section 5A in the attaching member 5 are connected with each other. Further, the attaching screw 6B is fastened by using the screw hole 52 in the attaching member 5 and the screw hole 431 in the housing 41 of the speaker box 4, and thereby the rear surface S41 in the housing 41 of the speaker box 4 and the connection section 5A in the attaching member 5 are connected with each other. Further, the connection section 5B in the attaching member 5 is inserted into the attaching hole 421 in the housing 41 of the speaker box 4, and thereby the rear surface S41 in the housing 41 of the speaker box 4 and the connection section 5B in the attaching member 5 are connected with each other.

In the second usage aspect, as in the foregoing first usage aspect, in the display unit 1, the thickness T1 of the main body section 2 is relatively small. Therefore, the second usage aspect has a configuration suitable as wall-hanging type that is a usage aspect with a high regard for realizing a thinned display unit. Further, the sound Sout from the speaker unit 40 is outputted to the user side. Therefore, differently from the foregoing first usage aspect, the second usage aspect has a configuration with a high regard for sound and design (achieving balance between the sound and the design).

[Third Usage Aspect]

Figure 8A:
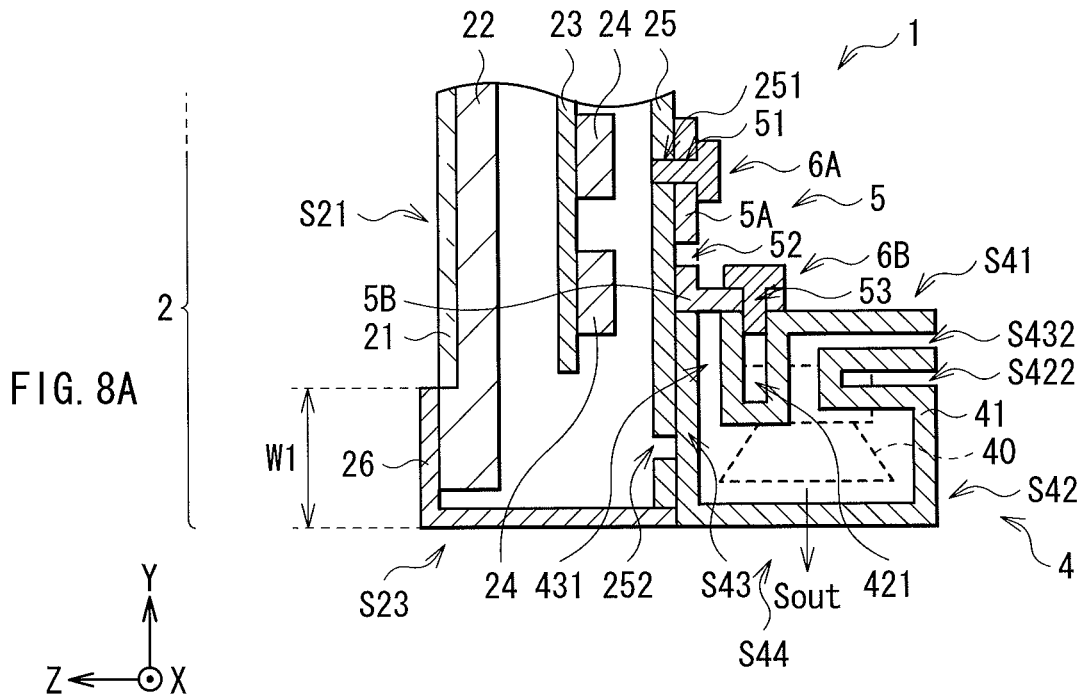
FIGS. 8A and 8B are schematic views for explaining a third usage aspect of the display unit illustrated in FIG. 1.
Figure 8B:
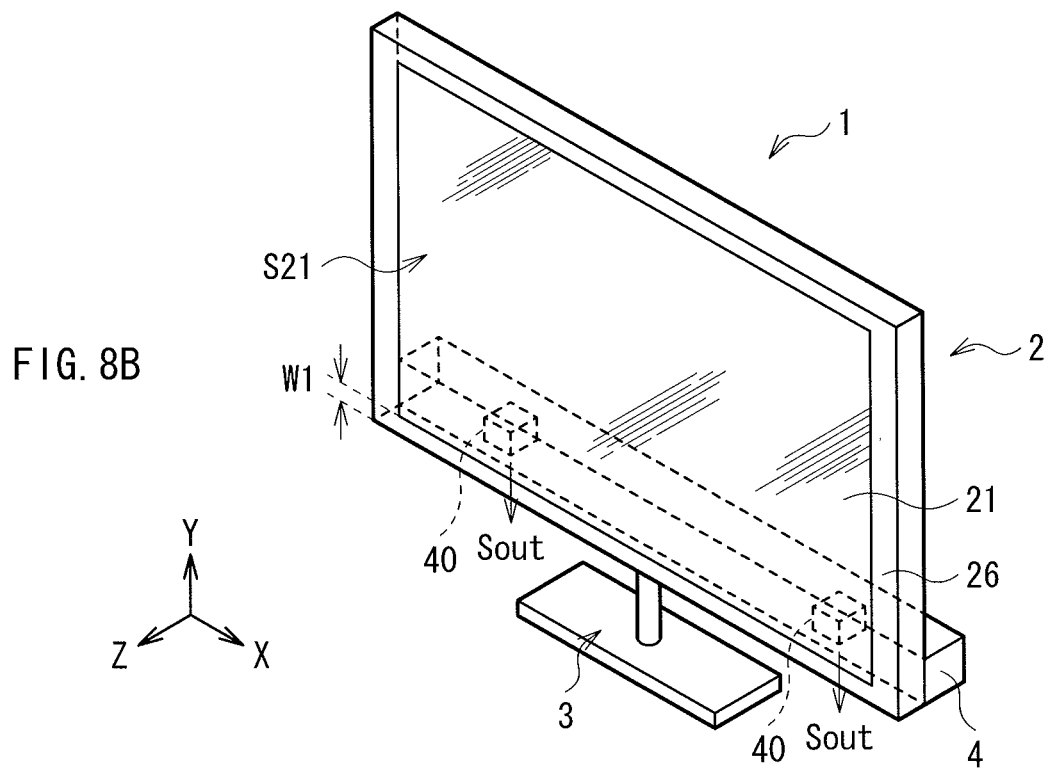

Meanwhile, in a third usage aspect illustrated in FIGS. 8A and 8B, the speaker box 4 is attached to the rear surface S22 of the main body section 2 so that the rear surface S22 of the main body section 2 is contacted with the upper surface S43 of the housing 41, and the sound Sout is outputted in the lower direction. At this time, more specifically, the attaching screw 6A is fastened by using the screw hole 51 in the attaching member 5 and the screw hole 251 in the rear cover 25 of the main body section 2, and thereby the rear surface S22 in the main body section 2 and the connection section 5A in the attaching member 5 are connected with each other. Further, the attaching screw 6B is fastened by using the screw hole 53 in the attaching member 5 and the attaching hole 421 in the housing 41 of the speaker box 4, and thereby the rear surface S41 in the housing 41 of the speaker box 4 and the connection section 5B in the attaching member 5 are connected with each other.

In the third usage aspect, differently from the foregoing first usage aspect and the foregoing second usage aspect, in the display unit 1, the width W1 of the frame region is relatively small. Therefore, the third usage aspect has a configuration suitable as stationary type that is a usage aspect with a high regard for realizing a narrowed frame. Further, as in the first usage aspect, the sound Sout from the speaker unit 40 is outputted in the lower direction (the sound Sout is not outputted to the user side). Therefore, the third usage aspect has a configuration with a high regard for design more than sound.

As described above, in this embodiment, the speaker box 4 is selectively attachable with respect to one of the lower surface S23 and the rear surface S22 in the main body section 2. In addition, the attaching member 5 is commonly used for both at the time of attachment to the lower surface S23 and at the time of attachment to the rear surface S22. Therefore, while variety of aspects of attaching the speaker box 4 to the main body section 2 is realized, a member (attaching member) unnecessary at the time of the respective attachment works is allowed to be omitted. Therefore, while usability of a user is improved, cost of members is allowed to be decreased.

Modifications

Subsequently, a description will be given of modifications (first and second modifications) of the foregoing embodiment. The same components as those of the foregoing embodiment will be affixed with the same referential symbols, and descriptions thereof will be omitted as appropriate.

First Modification

Figure 9A:
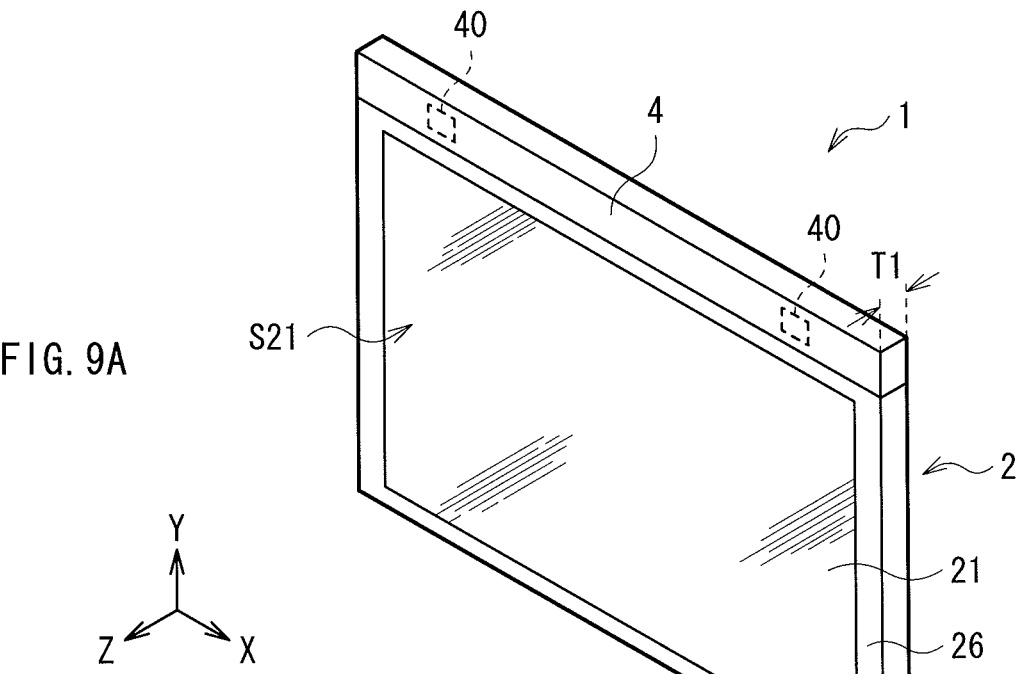
FIGS. 9A and 9B are schematic views illustrating outline configurations of a display unit according to a first modification.
Figure 9B:
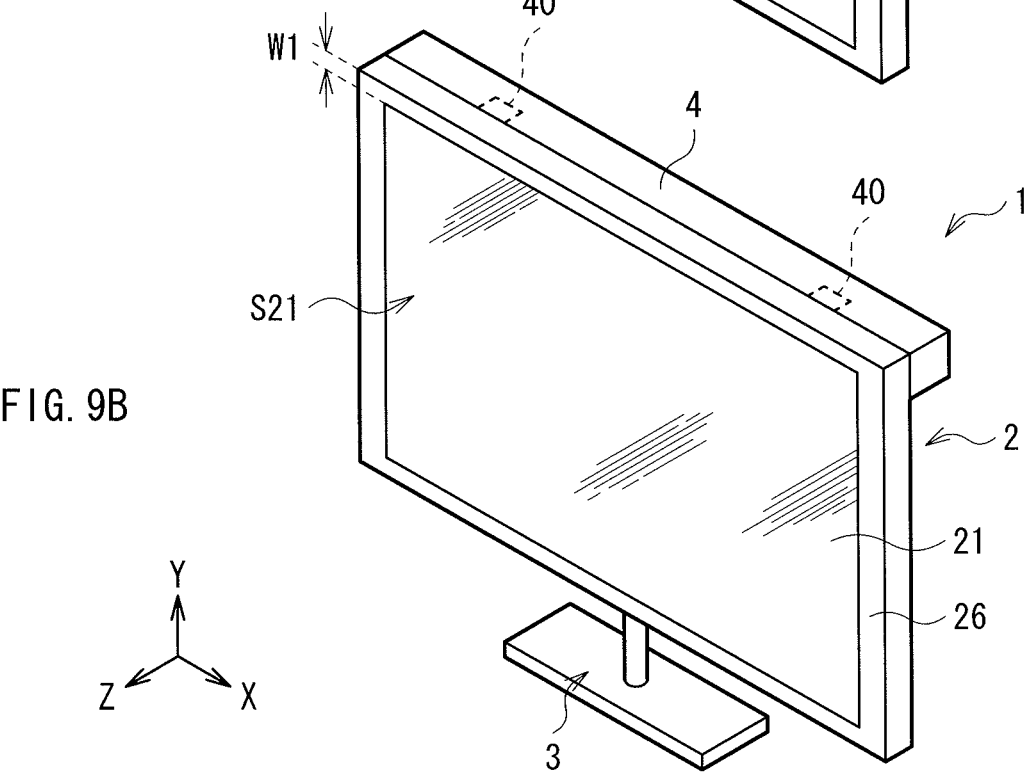

FIGS. 9A and 9B schematically illustrate outline configurations of the display unit 1 according to the first modification with a use of perspective views. In the display unit 1 according to this modification, differently from in the display unit 1 according to the foregoing embodiment, the speaker box 4 is selectively attachable with respect to one of the upper surface out of side surfaces in the main body section 2 and the rear surface 22 in the main body section 2.

Specifically, in a usage aspect illustrated in FIG. 9A, the speaker box 4 is attached to the upper surface of the main body section 2, and for example, the sound Sout from the speaker unit 40 is outputted to the user side. In this usage aspect, in the display unit 1, the thickness T1 of the main body section 2 is relatively small. Therefore, this usage aspect has a configuration suitable as wall-hanging type that is a usage aspect with a high regard for realizing a thinned display unit.

Meanwhile, in a usage aspect illustrated in FIG. 9B, the speaker box 4 is attached to the rear surface S22 of the main body section 2, and for example, the sound Sout from the speaker unit 40 is outputted in the upper direction. In this usage aspect, in the display unit 1, the width W1 of the frame region is relatively small. Therefore, this usage aspect has a configuration suitable as stationary type that is a usage aspect with a high regard for realizing a narrowed frame.

As described above, the speaker box 4 may be selectively attachable with respect to one of other side surface (in this case, the upper surface) in the main body section 2 and the rear surface 22 in the main body section 2.

Second Modification

Figure 10A:
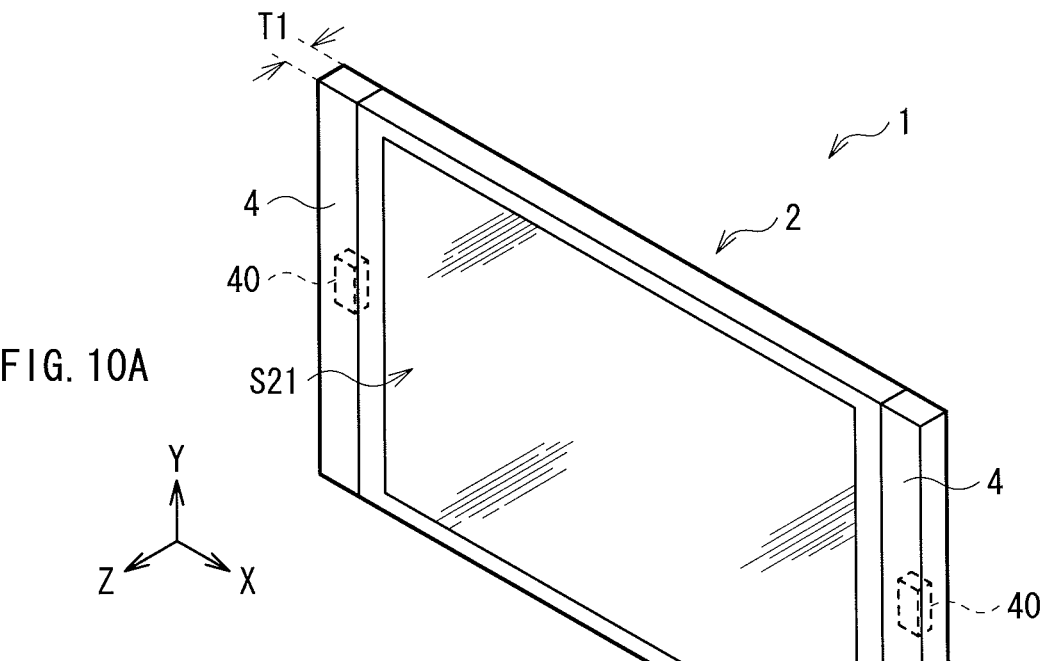
FIGS. 10A and 10B are schematic views illustrating outline configurations of a display unit according to a second modification.
Figure 10B:
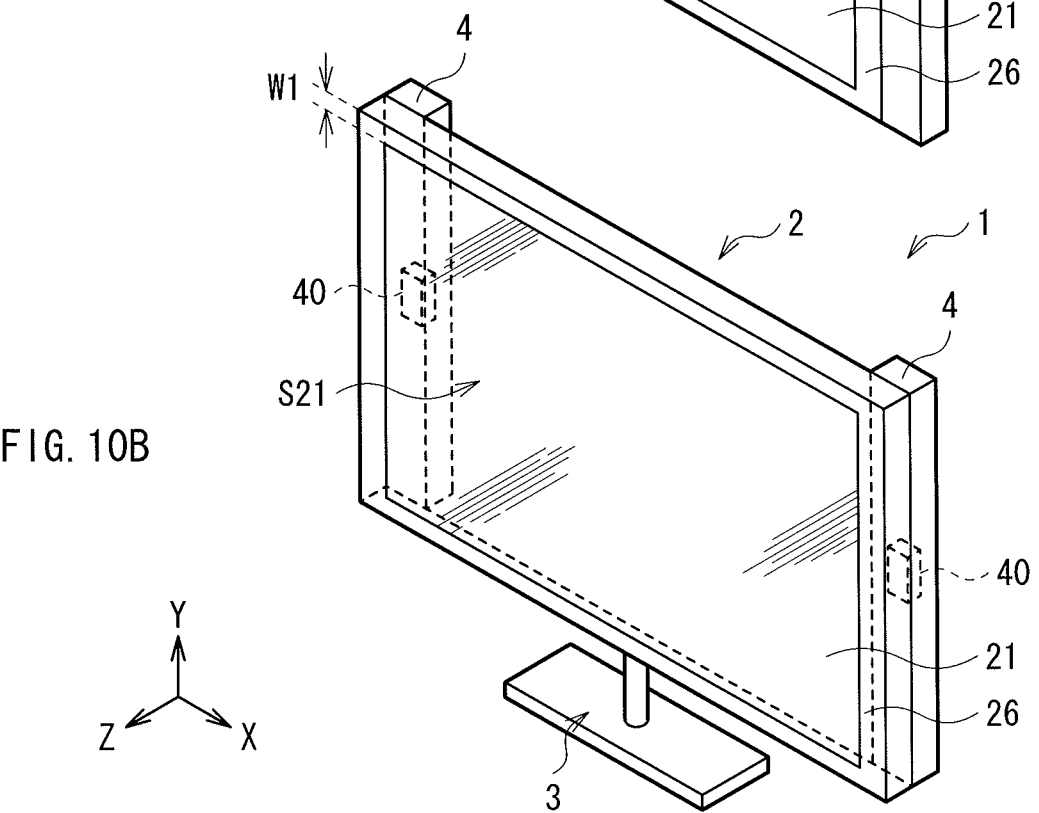

FIGS. 10A and 10B schematically illustrate outline configurations of the display unit 1 according to the second modification with a use of perspective views. In the display unit 1 according to this modification, differently from the foregoing embodiment and the foregoing first modification, the speaker box 4 is selectively attachable with respect to one of both the right surface and the left surface out of side surfaces in the main body section 2 and the rear surface S22 in the main body section 2. Therefore, in the second modification, the display unit 1 includes two speaker boxes 4 each housing one speaker unit 40 (a right speaker unit or a left speaker unit).

Specifically, for example, in a usage aspect illustrated in FIG. 10A, the two speaker boxes 4 are attached to the right surface and the left surface of the main body section 2, and for example, the sound Sout from the speaker unit 40 is outputted to the user side. In this usage aspect, in the display unit 1, the thickness T1 of the main body section 2 is relatively small. Therefore, this usage aspect has a configuration suitable as wall-hanging type that is a usage aspect with a high regard for realizing a thinned display unit.

Meanwhile, in a usage aspect illustrated in FIG. 10B, the two speaker boxes 4 are respectively attached to the rear surface S22 of the main body section 2, and for example, the sound Sout from the speaker unit 40 is outputted in the right and left directions (X-axis direction). In this usage aspect, in the display unit 1, the width W1 of the frame region is relatively small. Therefore, this usage aspect has a configuration suitable as stationary type that is a usage aspect with a high regard for realizing a narrowed frame.

As described above, the speaker box 4 may be selectively attachable with respect to one of other side surface (in this case, both the right surface and the left surface) in the main body section 2 and the rear surface 22 in the main body section 2.

Other Modifications

The technology of the present disclosure has been described with reference to the embodiment and the modifications. However, the technology is not limited to the foregoing embodiment and the like, and various modifications may be made.

For example, in the foregoing embodiment and the like, the configurations of the main body section 2, the speaker box 4, the attaching member 5, and the like have been described with the specific examples. However, the configurations thereof are not limited thereto, and other configurations may be adopted. Specifically, the number, the position, the fastening method, and the like of the respective attaching holes 421 and 422 and the respective screw holes 431 and 432 in the speaker box 4 are not limited to those described in the foregoing embodiment and the like, and other configurations may be adopted (fastening part is not limited to a screw, and for example, a attachable rivet, a attachable latch, and the like may be used).

Further, in the speaker box 4, a direction (arrangement direction) of the speaker unit 40 in the housing 41 may be slightly tilted from the direction described in the foregoing embodiment and the like. Further, such a direction may be arbitrarily changed.

Note that the technology may be configured as follows.

(1) A display unit including:
a main body section including a first front surface, a first rear surface, and a first side surface;
one or a plurality of speaker boxes each including one or a plurality of speaker units and a housing containing the one or a plurality of speaker units, the one or a plurality of speaker boxes being selectively attachable with respect to one of the first side surface and the first rear surface in the main body section; and
one or a plurality of attaching members commonly used for both at the time of attaching the one or a plurality of speaker boxes to the first side surface and at the time of attaching the one or a plurality of speaker boxes to the first rear surface.

(2) The display unit according to (1), wherein the attaching member includes
a first connection section being used for both connection with the main body section side and connection with the speaker box side, and
a second connection section being selectively used for connecting with the speaker box side.

(3) The display unit according to (2), wherein the first connection section includes a first member screw hole and a second member screw hole, the first member screw hole being used for both attachment to the first side surface and attachment to the first rear surface, and the second member screw hole being selectively used for attachment to the first side surface, and
the second connection section includes a third member screw hole being selectively used for attachment to the first rear surface.

(4) The display unit according to (3), wherein
the housing includes a second front surface, a second rear surface, and one or a plurality of second side surface being defined by arrangement direction of the speaker unit, and
each of the second rear surface and the one or the plurality of second side surfaces is provided with holes, the holes being used for attachment to the main body section.

The display unit according to (4), wherein
as the holes used for attachment to the main body section, one or a plurality of first attaching holes and one or a plurality of first speaker screw holes are provided in the second rear surface, and
as the holes used for attachment to the main body section, one or a plurality of second attaching holes and one or a plurality of second speaker screw holes are provided in the one or the plurality of second side surfaces.

(6) The display unit according to (5), wherein the first rear surface in the main body section is provided with one or a plurality of first main body screw holes and one or a plurality of second main body screw holes, the one or the plurality of first main body screw holes being selectively used for attachment to the first rear surface, and the one or the plurality of second main body screw holes being selectively used for attachment to the first side surface.

(7) The display unit according to (6), wherein in attaching the speaker box to the first side surface by contacting the first side surface with the second rear surface,
screw-tightening is made by using the first member screw hole and the second main body screw hole, and thereby the first rear surface in the main body section and the first connection section are connected with each other,
screw-tightening is made by using the second member screw hole and the second speaker screw hole, and thereby the second side surface in the speaker box and the first connection section are connected with each other, and
the second connection section is inserted into the second attaching hole, and thereby the second side surface in the speaker box and the second connection section are connected with each other.

(8) The display unit according to (6), wherein in attaching the speaker box to the first side surface by contacting the first side surface with the second side surface,
screw-tightening is made by using the first member screw hole and the second main body screw hole, and thereby the first rear surface in the main body section and the first connection section are connected with each other,
screw-tightening is made by using the second member screw hole and the first speaker screw hole, and thereby the second rear surface in the speaker box and the first connection section are connected with each other, and
the second connection section is inserted into the first attaching hole, and thereby the second rear surface in the speaker box and the second connection section are connected with each other.

(9) The display unit according to (6), wherein in attaching the speaker box to the first rear surface by contacting the first rear surface with the second side surface,
screw-tightening is made by using the first member screw hole and the first main body screw hole, and thereby the first rear surface in the main body section and the first connection section are connected with each other, and
screw-tightening is made by using the third member screw hole and the first attaching hole, and thereby the second rear surface in the speaker box and the second connection section are connected with each other.

(10) The display unit according to (1) or (2), wherein
the housing includes a second front surface, a second rear surface, and one or a plurality of second side surfaces being defined by arrangement direction of the speaker unit, and
each of the second rear surface and the one or the plurality of second side surfaces is provided with holes, the holes being used for attachment to the main body section.

(11) The display unit according to (10), wherein
as the holes used for attachment to the main body section, one or a plurality of first attaching holes and one or a plurality of first speaker screw holes are provided in the second rear surface, and
as the holes used for attachment to the main body section, one or a plurality of second attaching holes and one or a plurality of second speaker screw holes are provided in the one or the plurality of second side surfaces.

(12) The display unit according to any one of (1), (2), (10), and (11), wherein the first rear surface in the main body section is provided with one or a plurality of first main body screw holes and one or a plurality of second main body screw holes, the first main body screw hole being selectively used for attachment to the first rear surface, and the second main body screw hole being selectively used for attachment to the first side surface.

(13) The display unit according to any one of (1) to (12), wherein the speaker box is selectively attachable with respect to one of a lower surface or an upper surface as the first side surface, and the first rear surface.

(14) The display unit according to any one of (1) to (12), wherein the speaker box is selectively attachable with respect to one of a right surface and a left surface as the first side surface, and the first rear surface.

(15) The display unit according to any one of (1) to (14), wherein the main body section is formed by using a plurality of liquid crystal display devices or a plurality of organic EL display devices.

It should be understood by those skilled in the art that various modifications, combinations, sub-combinations, and alternations may occur depending on design requirements and other factors insofar as they are within the scope of the appended claims or the equivalents thereof.

What is claimed is:

1. A display unit comprising:
   a main body section including a first front surface, a first rear surface, and a first side surface;
   one or a plurality of speaker boxes each including one or a plurality of speaker units and a housing containing the one or a plurality of speaker units, the one or a plurality of speaker boxes being selectively attachable with respect to the main body section so to contact one of the first side surface or the first rear surface in the main body section; and
   one or a plurality of attaching members commonly used for both at the time of attaching the one or a plurality of speaker boxes to the first side surface and at the time of attaching the one or a plurality of speaker boxes to the first rear surface,
   each attaching member having a first connection section includes a first member screw hole and a second member screw hole, and a second connection section includes a third member screw hole, the first and the second connection section arranged perpendicular to each other such that said each attaching member has an L shape when viewed from a side thereof, and each said first connection section and each said second connection section having a rectangular cross sectional shape, and
   each said housing having a housing front surface from which sound is to be output, a housing rear surface which is opposite the front surface, and an upper housing side surface and a lower housing side surface, in which each said housing front surface, said housing rear surface,
   said upper housing side surface and said lower housing side surface extending in a longitudinal direction, and
   each said housing having one rectangular-shaped first attaching hole on the rear surface, one rectangular-shaped second attaching hole on the upper housing side surface, and at least one screw hole on the same housing side surface of said first attaching hole or said second attaching hole, each said first attaching hole or said second attaching hole is close ended with one opening for receiving the L shape attaching member.

2. The display unit according to claim 1, wherein
   the first connection section being used for both connection with the main body section side and connection with a speaker box side, and
   the second connection section being selectively used for connecting with the speaker box side.

3. The display unit according to claim 1, wherein the first rear surface in the main body section is provided with one or a plurality of first main body screw holes and one or a plurality of second main body screw holes, the first main body screw hole being selectively used for attachment to the first rear surface, and the second main body screw hole being selectively used for attachment to the first side surface.

4. The display unit according to claim 1, wherein the main body section is formed by using a plurality of liquid crystal display devices or a plurality of organic EL display devices.

5. The display unit according to claim 2, wherein
   as the holes used for attachment to the main body section, one or a plurality of the first attaching holes and one or a plurality of first speaker screw holes are provided in the housing rear surface, and
   as the holes used for attachment to the main body section, one or a plurality of the second attaching holes and one or a plurality of second speaker screw holes are provided in the one or the plurality of housing side surfaces.

6. The display unit according to claim 5, wherein the first rear surface in the main body section is provided with one or a plurality of first main body screw holes and one or a plurality of second main body screw holes, the one or the plurality of first main body screw holes being selectively used for attachment to the first rear surface, and the one or the plurality of second main body screw holes being selectively used for attachment to the first side surface.

7. The display unit according to claim 6, wherein in attaching the speaker box to the first side surface by contacting the first side surface with the housing rear surface,
   screw-tightening is made by using the first member screw hole and the second main body screw hole, and thereby the first rear surface in the main body section and the first connection section are connected with each other,
   screw-tightening is made by using the second member screw hole and the second speaker screw hole, and thereby the speaker box and the first connection section are connected with each other, and
   the second connection section is inserted into the second attaching hole, and thereby the speaker box and the second connection section are connected with each other.

8. The display unit according to claim 6, wherein in attaching the speaker box to the first side surface, screw-tightening is made by using the first member screw hole and the second main body screw hole, and thereby the first rear surface in the main body section and the first connection section are connected with each other, screw-tightening is made by using the second member screw hole and the first speaker screw hole, and thereby the speaker box and the first connection section are connected with each other, and the second connection section is inserted into the first attaching hole, and thereby the speaker box and the second connection section are connected with each other.

9. The display unit according to claim 6, wherein in attaching the speaker box to the first rear surface, screw-tightening is made by using the first member screw hole and the first main body screw hole, and thereby the first rear surface in the main body section and the first connection section are connected with each other, and screw-tightening is made by using the third member screw hole and the first attaching hole, and thereby the speaker box and the second connection section are connected with each other.

* * * * *